Patented Feb. 27, 1940

2,192,137

UNITED STATES PATENT OFFICE 2,192,137

DENATURED MATERIALS

Hamline M. Kvalnes, Wilmington, Del., assignor to E. I. du Pont de Nemours & Company, Wilmington, Del., a corporation of Delaware No Drawing. Application November 9, 1937, Serial No. 173,704

6 Claims. (Cl. 202—77)

This invention relates to denaturants and more particularly to denatured materials such as alcohols and esters and the method of denaturing them.

Many proposals have been made in the past for the use of various substances which, when mixed with a substance such as an alcohol, an ester or the like, completely change its taste and odor so that it cannot be diverted from its intended use. For example, this procedure has been applied to methanol to avoid its being taken internally, as well as to ethanol and other alcohols which might otherwise be diverted from their intended commercial use to that of a beverage. Similarly, materials such as ethyl acetate, and other esters, which might fairly easily be otherwise converted to alcohols and thus diverted from their intended use, have likewise been denatured. Upon chemical treatment of such esters, the denaturant has been intended to carry over to the alcohol and cause it to be unpotable.

Materials which have been proposed as denaturants before have had one or more characteristics which adapt them for denaturing purposes. There are, however, several specific features which it is desirable to have in a denaturant and all of which have not been possessed to a sufficient degree by many of the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the complete denatured alcohol commercially undesirable.

Another characteristic which a denaturant must possess is that of difficulty of removal from the denatured medium. As rapidly as denaturants have been proposed, methods have been discovered for their removal from the denatured medium. The methods utilized for removal of denaturants have been usually chemical treatment of the denatured medium combined with or followed by various distillation steps and further chemical treatment until, finally, relatively pure alcohol has been obtained. Up to the present invention very few, if any, denaturants extremely difficult of removal have been proposed which possess an unobjectionable but at the same time distinctive odor together with such a disagreeable taste that the combination practically prohibits the denatured medium from being taken internally.

It is an object of the present invention to overcome the disadvantages of the prior art and to provide a new denaturant and a denatured material which possess unusual characteristics previously desired but up until now unobtained.

It is a further object of the present invention to provide a denatured ethyl alcohol which possesses a distinctive but unobjectionable odor, and a taste which makes the ethyl alcohol unpotable, neither the taste nor the odor being removable from the ethyl alcohol.

It is an additional object of this invention to provide denatured esters of such a character that if converted to alcohols the denaturant causes such alcohols to be unpotable and of a distinctive odor. Another object of this invention is the production of a denatured gasoline, i. e. a gasoline which may be readily identified due to its denaturant content.

Other objects and advantages of the present invention will be apparent by reference to the following specification in which the preferred embodiments and details are set forth.

According to the present invention a denatured material from which it is extremely difficult if not impossible to remove the denaturant is prepared by mixing with a gasoline or an ester such as ethyl acetate or an alcohol, such as methyl, ethyl, propyl, and the like, relatively small quantities of a tertiary alcohol containing only the elements carbon, hydrogen, and oxygen, boiling in the range of from 100-200° C., and having the general formula:

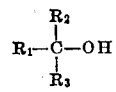

in which $R_1$, $R_2$ and $R_3$ may be saturated or unsaturated acyclic or isocyclic hydrocarbon groups.

The denaturants of this invention are generally applicable for treatment of any normally liquid material which it is desired to denature, although, preferably, the material to be denatured should have a boiling point in the range of 30° C. to 250° C. From a material having a boiling point in this range it will be found extremely difficult, if not impossible, to remove my denaturant.

A wide range of alcohols may be successfully denatured or distinguished from one another according to this invention including, such, for example, as methyl alcohol, ethyl alcohol, butyl alcohol, isobutyl alcohol, isopropyl alcohol, and others. In like manner, the denaturants of my invention are well adapted to denature gasoline, such, for example, as in cases where it is desired to distinguish particular gasolines for future identification.

Similarly, a large number of esters may be successfully denatured or distinguished from one another, substantially the only requisites being that the ester should have a boiling point in the range above indicated and, further, the ester should be one which might be fairly easily transformed into an alcohol. Thus, for example, in addition to denaturing ethyl esters, such as ethyl acetate as mentioned before, the denaturants of this invention may be applied to other esters such as methyl, propyl, isopropyl, butyl and isobutyl acetates and the like, or similarly to like formates, propionates, butyrates, isobutyrates and like esters. It will be found that alcohols produced from esters containing denaturing quantities of one or more denaturants of this invention are likewise denatured, being unpotable and possessing a distinctive odor.

Among the tertiary alcohols which are operable according to the present invention are:

1. 2-methyl-butanol-2
   $(CH_3)_2C(OH).C_2H_5$
2. 2-methyl-3-pentenol-2
   $CH_3.CH:CH.C(CH_3)_2.OH$
3. 3-methyl-1-pentynol-3
   $CH_3.CH_2.C(CH_3)(OH).C{:}CH$
4. 2,4-dimethyl pentanol 2
   $(CH_3)_2C(OH).CH_2.CH(CH_3)_2$
5. 2-methyl-5-hexenol-2
   $CH_2{:}CH.CH_2.CH_2.C(CH_3)_2OH$
6. 2-methyl-3-hexynol-2
   $(CH_3)_2C(OH).C{:}C.C_2H_5$
7. 2-methyl-heptanol-2
   $(CH_3)_2C(OH).CH_2.(CH_2)_3.CH_3$
8. 4-propyl-1,6-heptadienol-4
   $(CH_2{:}CH.CH_2)_2C(OH).(CH_2)_2.CH_3$ The use of these alcohols is illustrated in the examples which follow in which, however, additional tertiary alcohol denaturants of this invention are described as the denaturing mediums.

These tertiary alcohols possess an ethereal-camphoraceous odor and are unpotable because of taste. Both the odor and the taste persist in spite of the most drastic treatment utilized for their removal. So far as applicant is aware, there is no method by which these materials may be satisfactorily removed from the material denatured by them.

The following examples illustrate proportions of various materials which may be utilized as denaturants. It will be noted that small quantities only of the denaturant are necessary for denaturing purposes and that the material remaining after treatment for denaturant removal possesses a taste which renders the material unpotable and has a distinctive odor.

Example 1

An unpotable denatured alcohol was prepared by adding 1 volume of methyldiethyl carbinol to 100 volumes of pure 95% ethyl alcohol.

Example 2

200 cc. of a denatured alcohol, prepared by adding 1 volume of dimethylpropyl carbinol to 100 volumes of pure 95% ethyl alcohol, were mixed with 500 cc. of saturated salt solution, 500 cc. of water and 50 cc. of heavy petroleum oil. The mixture was shaken and allowed to stand approximately 2 hours. The alcoholic brine layer was then filtered through approximately 2 grams of activated carbon and distilled using an adiabatic column of approximately 4 theoretical plates. The distillate was collected at the rate of 1.5 cc. per minute using a high reflux ratio. The recovered alcohol had the odor and taste of the denaturant and was unpotable.

Example 3

A denatured alcohol, prepared by adding 1 volume of triethyl carbinol to 100 volumes of pure 95% ethyl alcohol, was treated by the procedure of Example 2. The distillate had the odor and taste of the denaturant and was unpotable.

Example 4

100 cc. of denatured alcohol, prepared by adding 5 volumes of methyl isobutyl ethynyl carbinol to 100 volumes of pure 95% ethyl alcohol, was mixed with 300 cc. of saturated salt solution, 100 cc. of water and 25 cc. of mineral oil. The mixture was shaken for 3 minutes and allowed to stand overnight. The water layer was shaken for 3 minutes with a second portion (20 cc.) of mineral oil and allowed to stand 1 hour. The alcoholic brine layer from the second extraction was shaken with 5 g. of activated carbon for 30 minutes and filtered. The filtrate was then given a similar treatment with a second 5 g. portion of activated carbon. The filtrate from the second carbon treatment was then distilled at a reflux ratio of 10:1 and a draw-off rate of 1 cc. per minute using a fractionating column of approximately 15 theoretical plates. The distillate had the odor and taste of the denaturant and was unpotable.

Example 5

An unpotable denatured alcohol was prepared by adding 5 volumes of diisopropyl ethynyl carbinol to 100 volumes of pure 95% ethyl alcohol.

Example 6

An unpotable alcohol was prepared by adding 5 volumes of dimethyl ethynyl carbinol to 100 volumes of pure 95% ethyl alcohol.

Example 7

A denatured ethyl propionate was prepared by adding 2 volumes of dimethyl isobutyl carbinol to 100 volumes of pure ethyl propionate.

Example 8

A denatured ethyl acetate was prepared by adding 2 volumes of dimethyl ethynyl carbinol to 100 volumes of 95% ethyl acetate.

Example 9

A denatured gasoline was prepared by adding 3 volumes of methyl isobutyl ethynyl carbinol to 100 volumes of gasoline.

Although not indicated in the examples above given, the materials of the present invention may be admixed with other denaturing materials, such, for example, as sulfur-containing materials, wood oil products, and other known denaturing materials. It may be desirable from time to time to add other denaturing materials which possess stronger and more disagreeable odors than the denaturants of the present invention as a method of distinguishing the denatured liquids or for other reasons. The materials of the present invention are miscible however, generally speaking, with anything with which ethyl alcohol is miscible and may, therefore, be utilized in conjunction with other denaturing materials generally, such as illustrated by the following additional examples which show representative, preferred mixtures.

Example 10

A completely denatured alcohol was prepared by mixing 100 parts of pure 95% ethyl alcohol, 3 parts of the mixture of primary and secondary higher iso-aliphatic alcohols and higher branched chain ketones (known under the name of "Denol") obtained in the high pressure, high temperature, vapor phase, catalytic synthesis of methanol from carbon monoxide and hydrogen, 2 parts of the liquid denaturant described and claimed in my copending application, S. N. 143,295, comprising a mixture of higher branched chain ketones and saturated and unsaturated hydrocarbons, and 2 parts of dimethyl isobutyl carbinol. The resulting denatured alcohol possessed a distinctive odor which rendered the alcohol unpotable.

Example 11

A completely denatured alcohol was prepared by mixing 100 parts of pure 95% ethyl alcohol, 3 parts dimethyl ethylnyl carbinol, 4 parts of the mixture of pyroligneous bodies, free from methanol, produced by the destructive distillation of wood, and 1 part of gasoline. The resulting denatured alcohol possessed a distinctive odor and an unpotable taste.

Example 12

A denatured alcohol prepared by mixing 100 parts of pure 95% ethyl alcohol, 2 parts of methyl isobutyl ethynyl carbinol, 2 parts of methyl isobutyl ketone, 1 part of the sulfur-containing residues obtained in the refining of petroleum, known under the name of "Agdite", and 1 part of gasoline. The denatured alcohol produced possessed a distinctive odor and a disagreeable taste which rendered the alcohol unpotable.

The proportions utilized according to the present invention may vary from a very small quantity, such as one-tenth of one per cent, up to ten per cent by volume or more of the alcohol, or ester which is to be denatured, the amount of denaturant depending entirely upon the degree of odor and taste desired. Small quantities are, however, generally sufficient, i. e., in the range of 0.1 to 5% by volume. A great advantage of the present denaturant resides in the fact that it does not render the alcohol, ester, gasoline or the like commercially and scientifically undesirable inasmuch as the general character of the denatured material is not changed by the incorporation of my denaturant.

Various changes may be made in the present invention without departing therefrom or sacrificing any of the advantages thereof.

I claim:

1. A denatured alcohol containing denaturing quantities of an unsaturated tertiary alcohol containing only carbon, hydrogen, and oxygen, and boiling in the range of from 100 to 200° C.

2. A denatured alcohol containing 0.1–10% by volume of an unsaturated tertiary alcohol containing only carbon, hydrogen, and oxygen, and boiling in the range of from 100 to 200° C.

3. A denatured ethyl alcohol containing 0.1–10% by volume of an unsaturated tertiary alcohol containing only carbon, hydrogen, and oxygen, and boiling in the range of from 100 to 200° C.

4. A denatured ethyl alcohol containing 0.1–5% by volume of an unsaturated tertiary alcohol containing only carbon, hydrogen, and oxygen, and boiling in the range of from 100 to 200° C.

5. A denatured alcohol containing denaturing quantities of dimethyl ethynyl carbinol.

6. A denatured alcohol containing denaturing quantities of methyl isobutyl ethynyl carbinol.

HAMLINE M. KVALNES.